US012700786B2

(12) United States Patent
Johnson

(10) Patent No.: US 12,700,786 B2
(45) Date of Patent: Aug. 4, 2026

(54) DUPLEX INVERTER GENERATOR

(71) Applicant: Imperial Industrial Supply Co.,
Ontario, CA (US)

(72) Inventor: Robert Johnson, Ontario, CA (US)

(73) Assignee: Imperial Industrial Supply Co.,
Ontario (CA)

( * ) Notice: Subject to any disclaimer, the term of this
patent is extended or adjusted under 35
U.S.C. 154(b) by 0 days.

(21) Appl. No.: 19/421,243

(22) Filed: Dec. 16, 2025

(65) Prior Publication Data

US 2026/0189118 A1     Jul. 2, 2026

Related U.S. Application Data

(60) Provisional application No. 63/739,457, filed on Dec.
27, 2024.

(51) Int. Cl.
*H02J 3/40*          (2026.01)
*H02K 47/20*        (2006.01)
*H02M 1/34*         (2007.01)

(52) U.S. Cl.
CPC .............. *H02K 47/20* (2013.01); *H02J 3/40*
(2013.01); *H02M 1/348* (2021.05)

(58) Field of Classification Search
CPC ...................................... H02J 3/40; H02J 3/38
USPC ...................................................... 307/47, 68
See application file for complete search history.

(56) References Cited

U.S. PATENT DOCUMENTS 4,797,570 A     1/1989 Fox
5,400,236 A     3/1995 Shimiza et al.

| 7,986,057 B2 * | 7/2011 | Ganev | H02J 3/38 |
| | | | 307/68 |
| 9,325,271 B2 | 4/2016 | Hashimoto et al. | |
| D1,022,928 S | 4/2024 | Lu et al. | |
| 11,962,160 B1 | 4/2024 | Lu et al. | |
| D1,031,655 S | 6/2024 | Lu et al. | |
| 2015/0069841 A1 | 3/2015 | Falk et al. | |
| 2018/0287392 A1 | 10/2018 | Maedako et al. | |
| 2024/0297369 A1 | 9/2024 | Lu et al. | |

OTHER PUBLICATIONS

PCT Written Opinion of the International Search Report for PCT/
US2025/061184 dated Mar. 5, 2026.

* cited by examiner

*Primary Examiner* — Daniel Kessie
*Assistant Examiner* — Dru M Parries
(74) *Attorney, Agent, or Firm* — Fleit Intellectual
Property Law; Paul D. Bianco; Jeffrey N. Giunta

(57)          ABSTRACT

A multiple inverter generator and operating method thereof.
A first inverter generator delivers AC) power through a first
power line to a power output and a second inverter generator
delivers AC power through a second power line. A low
current coupler selectively couples the first power line and
the second power line with limited electrical current. A
parallel power switch selectively couples the first power line
and the second power line. A controller activates, while the
parallel power switch electrically isolates the first power line
from the second power line, the low current coupler for a
synchronization time period to form a limited current elec-
trical connection. The controller also configures, within a
time out period after activation of the low current couple for
the synchronization time period, the parallel power switch to
electrically connect the first power line and the second
power line.

18 Claims, 6 Drawing Sheets

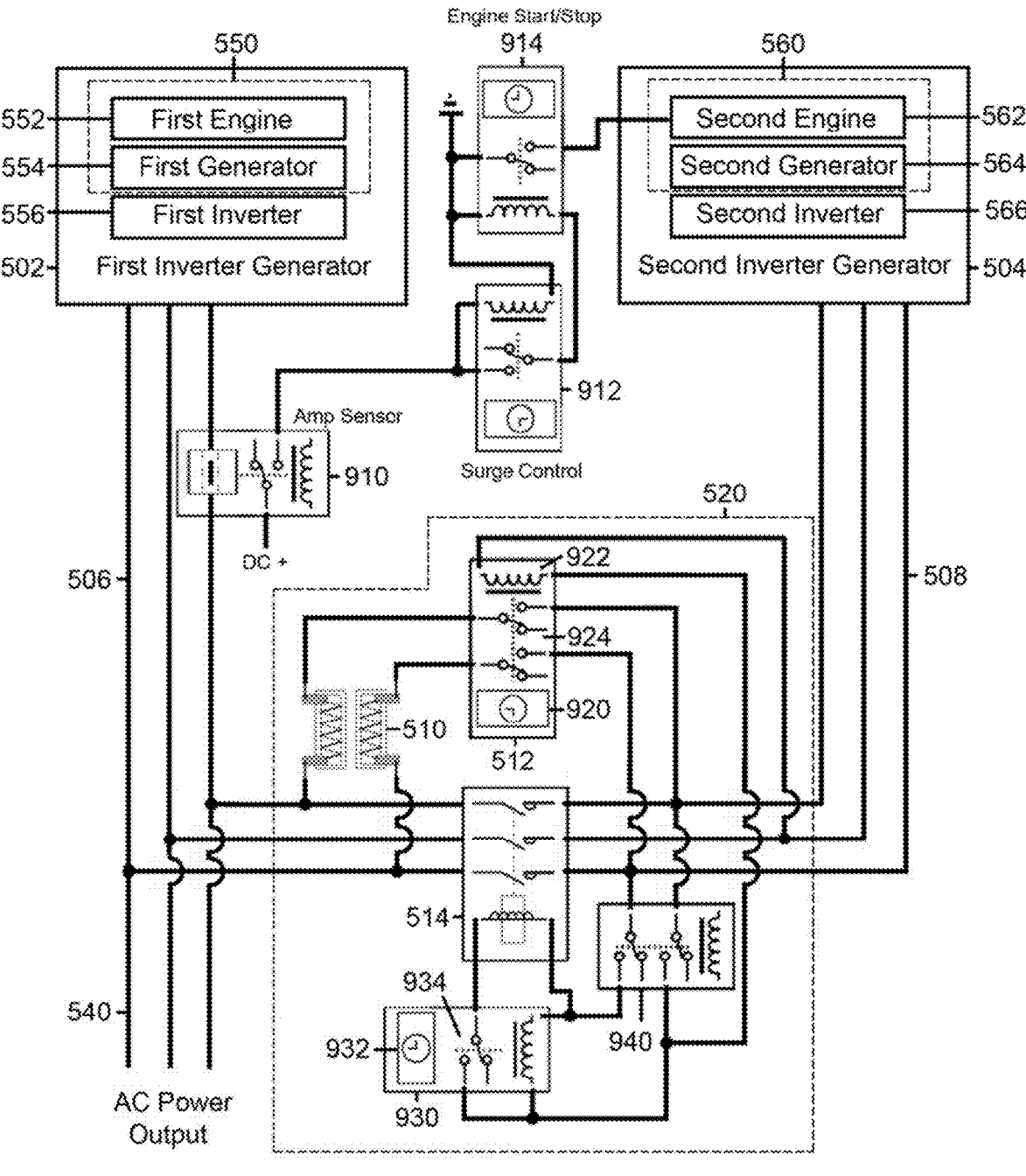
Fig. 9    900

DUPLEX INVERTER GENERATOR

BACKGROUND

Field of the Invention

The invention relates to duplex inverter generators that include two inverter generators combined in a single enclosure to work as a single unit, and more particularly to managing the cooperative operation of these two inverter generators.

Related Art

Inverter generators include electrical generation equipment that incorporates inverters to produce electrical power for output to various loads based on electrical power received from one or more sources. Such inverter generators are able to provide electrical power to the inverter from various sources such as, but not limited to, electrical generators driven by fossil fueled engines to provide electrical power to the inverter, battery or other energy storage systems to provide electrical power to the inverter, other sources of electrical power, or combinations of these. Inverter generators generally provide clean, stable power output, quiet operation, good fuel efficiency, and are effective power sources for sensitive electronics. Applications for inverter generators are sometimes limited by their expense and generally lower power output compared to traditional generators. In some cases, the output of two or more inverters are able to be combined to produce additional electrical power to be delivered to an electrical load.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 9 illustrates an alternative duplex inverter block diagram, according to an example.

DETAILED DESCRIPTION

Figures 1, 2, 3:
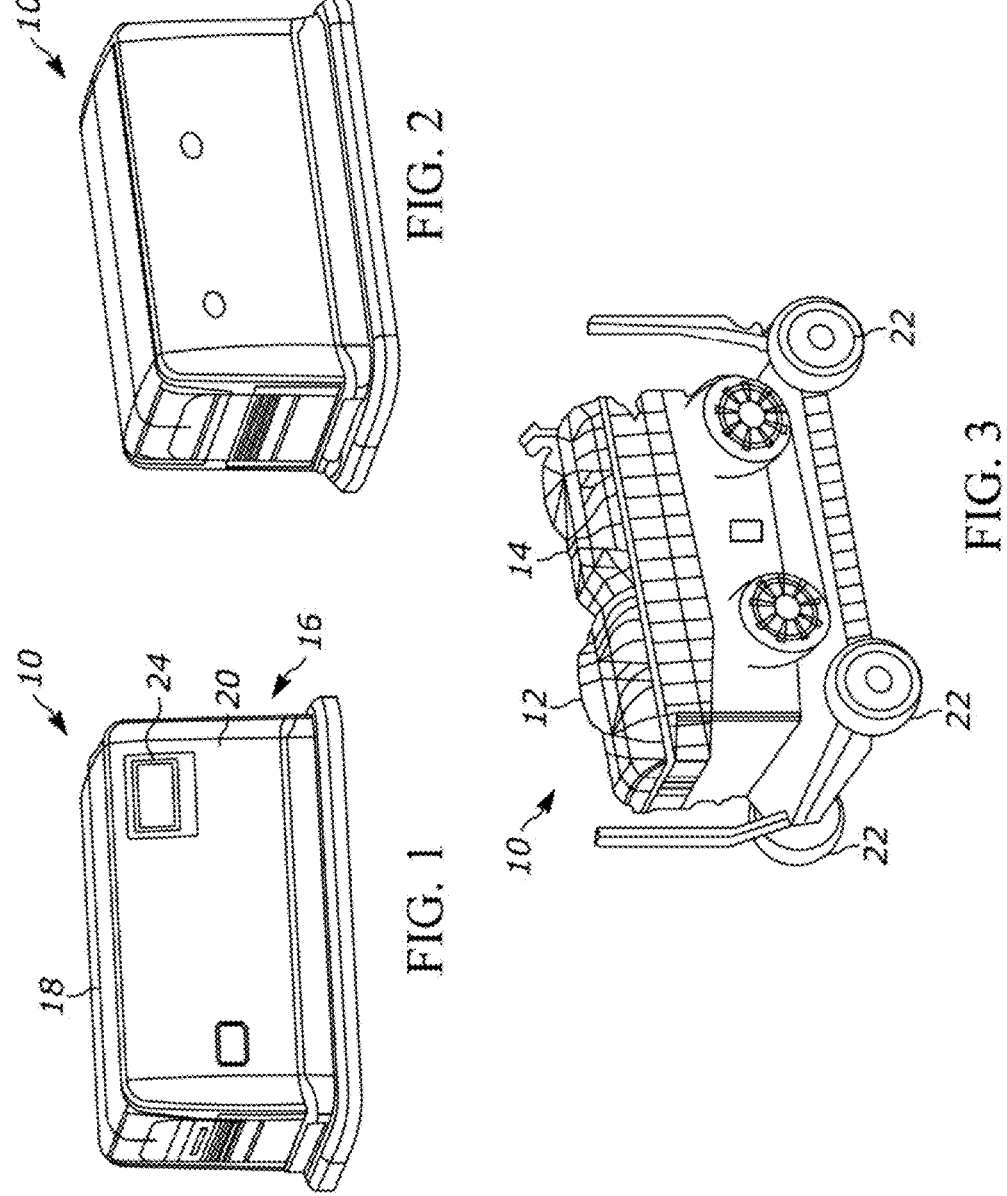
FIG. 1 is a front view of the duplex inverter generator according to the present invention.
FIG. 2 is a rear view of the duplex inverter generator of FIG. 1.
FIG. 3 is a front view of the duplex inverter generator of FIG. 1 with its enclosure removed.

As required, embodiments are disclosed herein; however, it is to be understood that the disclosed embodiments are merely examples and that the devices and methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts. After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise. The term plurality, as used herein, is defined as two or more than two. The term another, as used herein, is defined as at least a second or more. The term "coupled," as used herein, is defined as "connected," although not necessarily directly, and not necessarily mechanically.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A; B; C; A and B; A and C; B and C; and A, B, and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described in the general description or the examples are required, that a portion of a specific activity may not be required, and that one or more further activities can be performed in addition to those described. Still further, the order in which activities are listed are not necessarily the order in which they are performed.

With reference to FIGS. 1-3, some examples of the below described systems and methods include a duplex inverter generator 10 that includes a first inverter generator 12 and a second inverter generator 14 that are contained in an enclosure 16. As described in further detail below, the first inverter generator 12 and the second inverter generator 14 are able to be connected electrically in parallel to work in tandem to create an increased electrical power output. In an example, the first inverter generator 12 and the second inverter generator 14 are matched (e.g., have the same manufacturer and model number). However, the below described systems and methods are further able to be implemented with two or more inverter generators, such as the first inverter generator 12 and the second inverter generator 14, that are able to be any combination of matched, unmatched (e.g. different manufacturer, different model, different fuel, and/or different output etc.), or combinations of these.

For service and maintenance, enclosure 16 in some examples includes one or more panels that are removable. In some examples, enclosure 16 can be provided with wheels 22 to facilitate moving duplex inverter generator 10.

A display 24 shows operational parameters, examples of which include voltage, current, frequency, power output, engine speed, oil pressure, coolant temperature, run time, etc. Warning indicators can also be provided to alert the operator about potential issues such as overheating or low oil levels. Alternatively, or additionally, duplex inverter generator 10 can be provided with Bluetooth, Wi-Fi, and/or similar capability so that the display can be shown or a smartphone, computer, tablet, or similar device. Alternatively, or additionally, duplex inverter generator 10 can be controlled with a smartphone, computer, tablet, or similar device.

Figure 4:
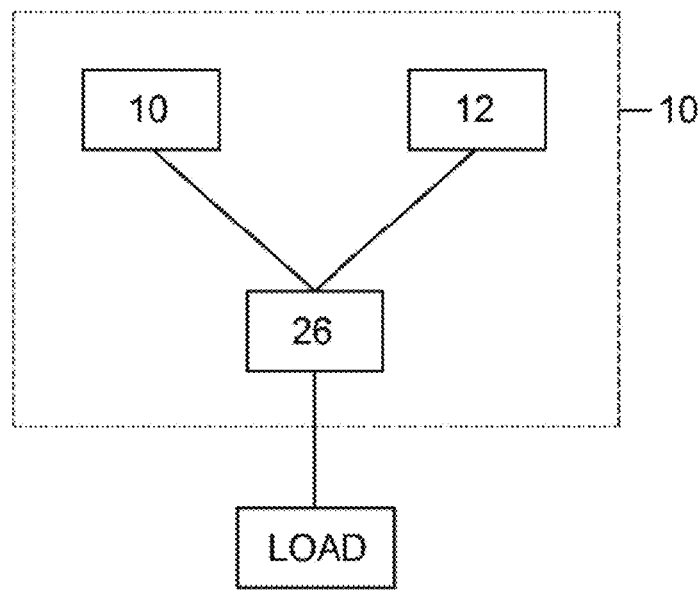
FIG. 4 schematically shows operation of the duplex inverter generator according to the present invention.

FIG. 4 illustrates a duplex inverter generator output power connection diagram 400, according to an example. As shown in the illustrated duplex inverter generator output power connection diagram 400, a controller 26 controls the operation of a duplex inverter generator 10. Known inverter generators have had the ability to parallel the electrical outputs of multiple generators to produce an electrical power output commensurate with the combined power capacity of multiple generators. As depicted by the above described example, a duplex inverter generator 10 includes two or more inverter generators, such as the first inverter generator 12 and the second inverter generator 14, that are contained in a single enclosure 16 to work as a single unit. The controller 26 performs functions to control the operation of the multiple inverter generators in a duplex inverter generator 10 and also orchestrate electrical connections between or among the outputs of the multiple inverter generators to facilitate combining and to support synchronization of the electrical outputs of the first inverter generator 12 and the second inverter generator 14.

To put it in simpler terms, combining the electrical output of multiple inverter generators, which is referred to as paralleling generators, includes connecting the output of two or more inverter generators together to increase available output power. This connection works together in a way that increases the wattage amount that is provided to loads such as equipment or a building being powered. Such paralleling in some cases allows turning one or more inverter generators on and off to match increases the power demand to supply more than just the basic necessities to be on and running during a power emergency and then reducing the power generation and fuel consumption when the power demand decreases. A challenge with paralleling generators is synchronizing the frequency and phase of the AC electrical power produced by each of the multiple inverter generators.

The controller 26, sometimes in conjunction with controllers within each inverter generator, manages the electrical output power of the duplex inverter generator 10 to increase the electrical power produced by the duplex inverter generator 10 to handle its present load. In some examples, such operations provide a required amount of electrical power output without needlessly generating excessive power levels. Controller 26, and sometimes controllers within each inverter generator, operates to sense the load and manages the operations of the first inverter generator 12 and the second inverter generator 14. Thus, advantages of the duplex inverter generator 10 according to the invention include the ability to reduce fuel consumption, lower noise, add redundancy, and cut emissions. In contrast, existing backup generators typically operate with a constant engine speed that corresponds to the backup generators maximum rated power to produce electrical power regardless of the demands of the connected load. The advantageous scaling or optimization of the output of duplex inverter generator 10 is illustrated with reference to the following scenarios.

In scenario 1 (which would be typical of daytime use), a duplex inverter generator operates with a higher power output to supply a higher load demand driven by a number of household devices, such as lights, refrigerator, microwave, dishwasher, washer and dryers, air conditioners, and a host of other household devices.

In scenario 2 (which would be typical of nighttime use), the load would usually be greatly reduced, such as lights, refrigerator, and small electronics. Normally to run these items with a traditional home standby the generator would have to run at full speed to produce only 5% to 10% of the generator's capacity whereas a duplex inverter generator 10 only runs one of the inverter generators, e.g., the first inverter generator 12 or the second inverter generator 14. In some examples, this one inverter generator is able operate at a reduced engine speed which results in substantial noise reductions and fuel savings. As the electrical load increases, the engine speed of the one inverter generator is increased until, at a certain power demand level, the other inverter generator would be automatically started to deliver a combined electrical power output that is scaled proportionately to be able to handle the needs of the house.

Exemplary operational modes of duplex inverter generator 10 are as follows.

Full Auto or Eco Mode allows for adaptive power on demand. The duplex inverter generator 10 starts with one of the one of two inverter generators running, such as the first inverter generator 12 for example, at about 15% of the capacity of the first inverter generator 12 (e.g. one inverter generator 12 has its engine running at 1,200 RPM). This output power level supports, for example, lights, refrigerator, and small devices. As additional devices, such as a microwave, a vacuum cleaner, etc., are started, the first inverter generator 12 matches this increased load by increasing its engine speed to 2,200 RPM. When the load being driven by the first inverter generator 12 reaches a preset threshold of the capacity of the first inverter generator 12, in an example, the second inverter generator 14 is automatically started after the first inverter has reached its preset threshold. The second inverter generator 14 at this stage is configured to have its engine run at a standby, e.g., relatively low, speed for a set period of time while its output power is allowed to synchronize and stabilize before the two power outputs are combined. If the load is further increased, by starting other devices such as a stove, Air Conditioning, pool pump, etc., both inverter generators 12, 14 increase their engine speed to meet the new load demand. If the load decreases, the second generator automatically turns off after a set amount of time over which the load demand does not exceed the preset threshold. If, after such a load decrease, the threshold is exceeded during the set amount of time, the time period resets. If the time period expires and the second generator does not exceed the threshold the generator turns off.

Full Auto High Demand Mode does not include idle control but rather operates the first inverter generator 12 at full engine speed and then, as needed, automatically starts the second inverter generator 14 based on load demand in order to be able to respond quicker to larger intermittent surge loads like air conditioners and well pumps.

Manual Eco Mode is able to be used during, for example, light demand scenario (typically nighttime use. One inverter generator, such as the first inverter generator 12, is operated with idle control. In some examples, such operations can alternate using the first inverter generator 12 and the second inverter generator 14 so as to allow each inverter generator to have roughly the same amount of use for a prolonged service life.

Manual High Demand Mode is an example of an operating mode to be used during high demand scenario. In the manual high demand mode, both inverter generators operate with their maximum engine speed and produce the highest amount of electrical power that the combination of both inverter generators can deliver instantly. This mode is able to be used when powering electrical loads near the capacity to the duplex inverter generator 10 for a prolonged period of time.

Figure 5:
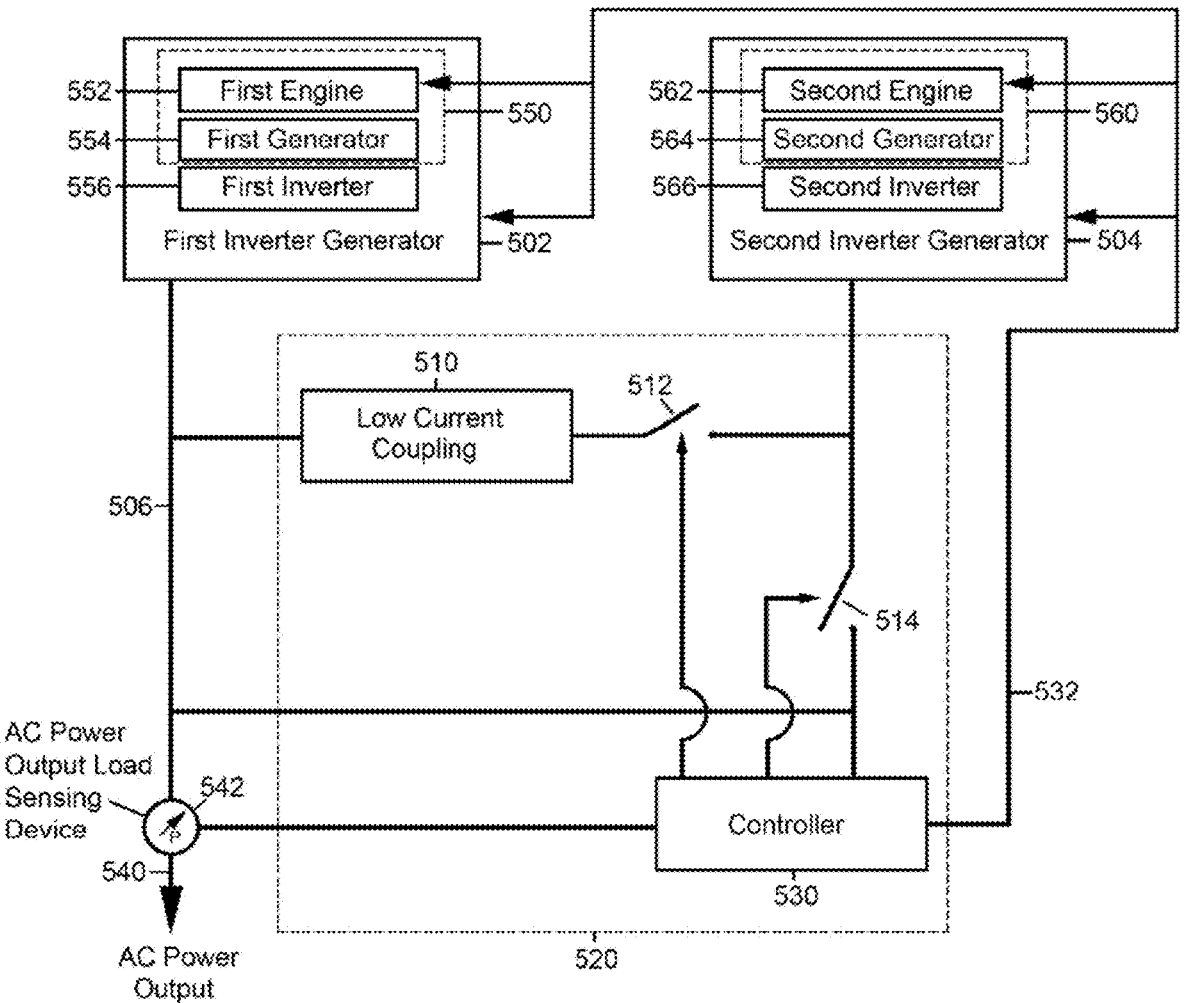
FIG. 5 illustrates a duplex inverter generator block diagram, according to an example.

FIG. 5 illustrates a duplex inverter generator block diagram 500, according to an example. The illustrated duplex inverter generator block diagram 500 depicts components of a duplex inverter generator system, such as the above described duplex inverter generator 10, that incorporates aspects of the presently described systems and methods. The components of the duplex inverter generator block diagram 500 allows two inverter generators to be selectively operated individually or with their power outputs combined in parallel to provide additional output power to the loads connected to the duplex inverter generator block diagram 500 according to the modes of operation described above.

The duplex inverter generator block diagram 500 depicts a first inverter generator 502 and a second inverter generator 504. In an example, the first inverter generator 502 and the second inverter generator 504 each includes a separate inverter that receives electrical energy in various forms and each inverter produces a bi-phase, otherwise known as split phase, AC power output. In further examples, each inverter generator is able to produce electrical power with other output configurations. In various examples, each inverter is able to receive electrical power from its power source in either AC or DC form, from one or more of a combustion powered generator, an electrical storage device such as a battery, from any other source, or from combinations of these.

The first inverter generator 502 in the illustrated example includes a first power source 550 that provides electrical energy to a first inverter 556. The illustrated first power source 550 includes a first engine 552 and a first generator 554. The first engine 552 in an example is a combustion engine that drives the first generator 554 to produce electrical power that is delivered to the first inverter 556 to produce an electrical AC output. In further examples, the first power source 550 is able to include any electrical power source to provide electrical energy to the first inverter 556, such as a stored energy source that includes a battery. The second inverter generator 504 similarly has a second power source 560 that includes a second engine 562 and a second generator 564 that provides electrical energy to a second inverter 566 within the second inverter generator 504.

The duplex inverter generator block diagram 500 includes a power output 540 to provide bi-phase AC power to various connected loads (not shown). An AC output power load sensing device 542, such as an output power meter, measures the present amount of electrical power delivered to the power output 540. The amount of power delivered to the power output 540 is based on the power demand of connected loads drawing power through the power output 540.

An output of the first inverter generator 502 provides bi-phase AC power to a first power line 506 and an output of the second inverter generator 504 provides bi-phase AC power to a second power line 508. In the illustrated example, the first power line 506 is connected to the power output 540. The second power line 508 is connected to the power output 540 through a second inverter output switch 514. In an example, the first power line 506, the second power line 508, and the power output 540 are split phase power lines.

The duplex inverter generator block diagram 500 includes a coupling circuit 520 that includes various elements. The coupling circuit 520 is similar to the above described controller 26 includes a control processor 530 that controls the operation of various components within the duplex inverter generator block diagram 500. The illustrated coupling circuit 520 further includes components that selectively couple the output of the first inverter generator 502 and the second inverter generator 504 to support synchronization of their AC power outputs and combining their output AC power. The illustrated coupling circuit 520 includes a low current coupling 510 that is in series with a low current coupling switch 512 to support synchronization of the two inverter generators. The illustrated controller further includes the second inverter output switch 514 to couple the power outputs of the two inverter generators.

The control processor 530 in an example receives AC output power measurements from the AC output power load sensing device 542. In some examples, the control processor 530 determines whether to operate only one inverter generator or both inverter generators based on the AC power output level measured by the AC output power load sensing device 542. The illustrated control processor 530 controls the operations of the inverter generators via a generator control interface 532.

The control processor 530 determines, in some modes of operation based on the amount of AC output power measured by the AC output power load sensing device 542, whether the presently measured AC output power level is below a first threshold that corresponds to a power level that can be produced by only one inverter generator. In order to improve the operational efficiency of the duplex inverter depicted in the duplex inverter generator block diagram 500, when the AC output power level is below the first threshold, the control processor 530 responds by turning off the second inverter generator 504, such as by turning off the second engine 562 driving the second generator 564, and only operating the first inverter generator 502 to provide power to the power output 540. In some examples, this is preceded by opening the second inverter output switch 514 under the control of the control processor 530 to disconnect the second power line 508, and thus the second inverter generator 504, from the power output 540.

The first threshold in an example is set at a level below the maximum power output of the first inverter generator 502. The control processor 530 in an example determines when the present AC output power level as measured by the AC output power load sensing device 542 exceeds the first threshold and prepares to provide an increased amount of AC output power. The control processor 530 in such an example operates to start the second inverter generator 504 and synchronize its AC power output to allow combining its AC power output with the AC power output of the first inverter generator 502.

The operation of components in the duplex inverter generator block diagram 500 allows synchronization of the second inverter generator 504 while the first inverter generator 502 is operating to provide power to the power output 540. The second inverter generator 504 is synchronized in this example by connecting the first power line 506 to the second power line 508 through a low current coupling 510 with the connection controlled by a low current coupling switch 512. The control processor 530 in an example closes the low current coupling switch 512 for a time period to allow synchronization of the AC power output of the second inverter generator 504 to the AC power being produced by the first inverter generator 502. Examples of various configurations of the low current coupling 510 are described in further details below. In some examples, the low current coupling switch 512 includes a timer relay that closes its contacts after activation and automatically opens those contacts after expiration of a set time period.

The low current coupling 510 in various examples operates to connect electrical voltage levels across the low current coupling while limiting the level of electrical current conveyed through the low current coupling. The use of a low current coupling in some examples allows sufficient coupling of the voltage waveform produced by the first inverter generator 502 to the output of the second inverter generator 504 to allow synchronization of their AC waveforms without excessive electrical current being transferred to potentially overload the generation and synchronization circuits.

Figure 6:
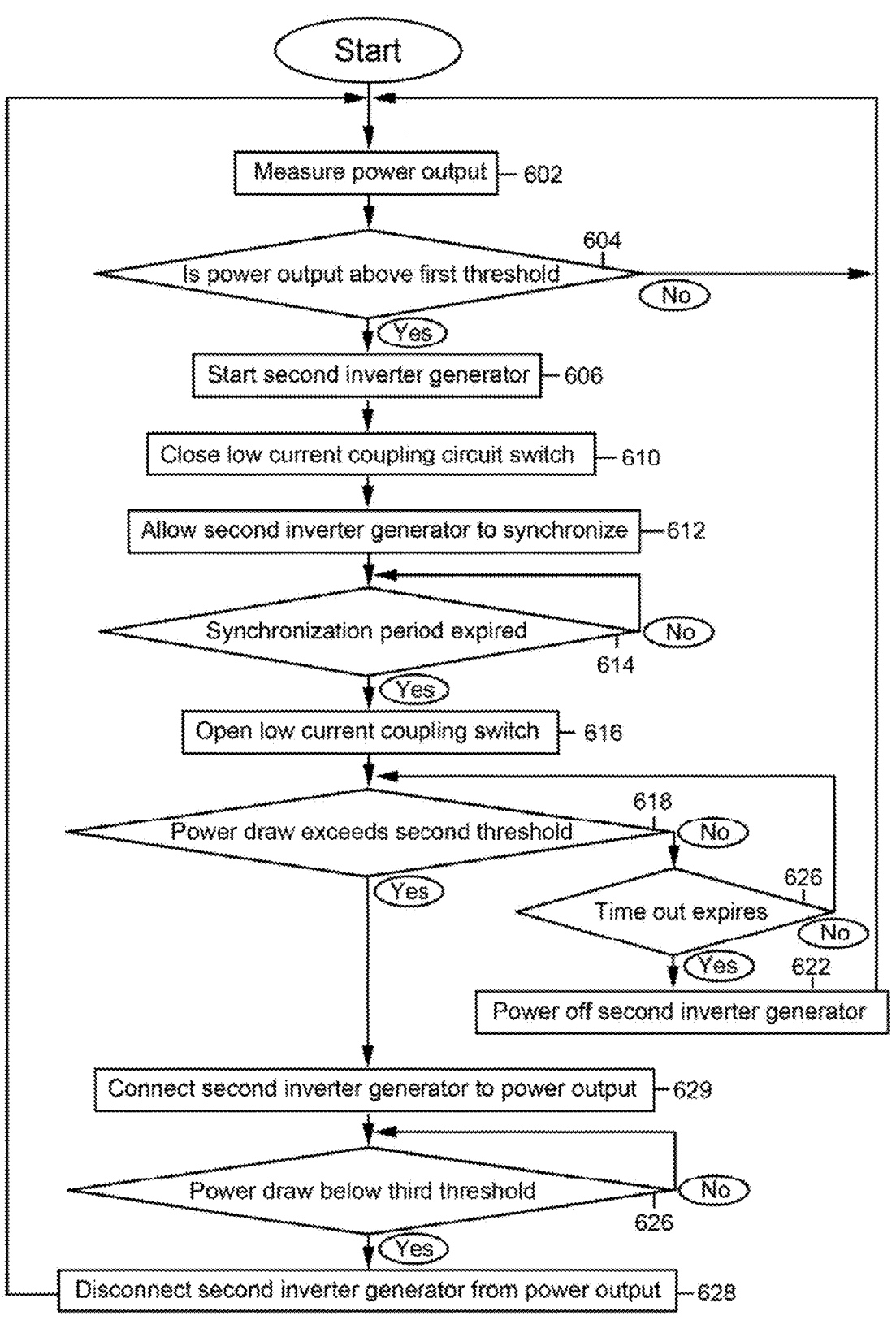
FIG. 6 illustrates a duplex inverter generator operating flow, according to an example.

FIG. 6 illustrates a duplex inverter generator operating flow 600, according to an example. The duplex inverter generator operating flow 600 is an example of a process performed by the above described control processor 530 of a duplex inverter generator such as the illustrated by the duplex inverter generator block diagram 500. The duplex inverter generator operating flow 600 depicts a process by which the operation of a duplex inverter generator is monitored and controlled to selectively operate one or two of the inverter generators contained in the duplex inverter generator based upon electrical load demand.

The duplex inverter generator operating flow 600 measures, at 602, power output of the duplex inverter generator. In an example, the power output is measured by the AC output power load sensing device 542 and reflects the level of electrical power output to the power output 540.

A determination is made, at 604, as to whether the measured power output is above the first threshold. If the determination is that the measured power output is not above the first threshold, the determination as to whether the measured power output is above the first threshold is repeated.

If it is determined, at 604, that the power output is above the first threshold, a second inverter generator is started, at 606. In an example where the second inverter generator receives power from an internal combustion engine, the control processor 530 operates to activate a starter for that combustion engine. In an example where the second inverter generator 504 initially receives power from a battery, the control processor 530 of that second inverter generator 504 starts the second inverter generator 504 by causing the second inverter 566 the inverter generator to produce AC output from the electrical power received from the battery.

After the second generator is started, at 606, a low current coupling switch is closed, at 610. In the above described example, the low current coupling switch 512 closes to connect the first power line 506 to the second power line 508 through the low current coupling 510, thereby connecting the electrical outputs of the two inverter generators without appreciable current flowing to or from the second inverter generator 504.

After closing the low current coupling switch, at 606, second inverter generator is allowed to synchronize, at 612. In an example, the second inverter generator 504 automatically synchronizes its AC power output to the AC power output of the first inverter generator 502 after the second power line 508 is connected to the first power line 506 via the low current coupling 510. In general, such synchronization is assumed to be accomplished after a defined synchronization time period. In an example, the synchronization time period is selected to be twenty seconds (20 S). In some examples, the synchronization time period is able to be selected to be between ten (10) to thirty (30) seconds(S) with other time synchronization periods also able to be selected. In order to facilitate this synchronization, the low current coupling switch 512 is closed for the synchronization time period.

A determination is made, at 614, as to whether the synchronization period has expired. This determination continues until the synchronization time period has expired.

After expiration of the synchronization time period, as determined at 614, the low current coupling switch is opened, at 616. In an example, the low current coupling switch, such as the above described low current coupling switch 512, is opened and thus disconnects the low current coupling 510 from coupling the outputs of the two inverter generators.

A determination is made, at 618, as to whether the power draw exceeds a second threshold. This second threshold is generally determined to have a value that is higher than the first threshold but also below the output power capacity of one of the inverter generators. In some examples, the second threshold is able to have a value similar to the first threshold.

If it is determined, at 618, that the power draw does not exceed the second threshold, a determination is made as to whether a timeout expires, at 620. This time out duration corresponds to a time period during which the second inverter generator continues to run without providing power to the power output of the duplex inverter generator. If it is determined, at 620, that the time out did not expire, the duplex inverter generator operating flow 600 returns to determining, at 618, if the power draw exceeds the second threshold. If it is determined, at 620, that the time out expired, the second inverter generator is powered off, at 622, and the duplex inverter generator operating flow 600 returns to measuring power output, at 602.

Returning to the determination, at 618, as to whether the power draw exceeds the second threshold, if this determination is true, the second inverter is connected, at 624, to the power output. This connection allows the AC electrical power produced by the first inverter generator and the second inverter generator to be combined and thereby increase the total power delivered to the power output. In this example, such combination of AC electrical power is advantageously facilitated by the above described synchronization processes using the low current coupling 510 and thereby allows faster addition of the electrical power provided by the second inverter generator based on electrical demand.

A determination is made, at 626, as to whether the power draw through the power output is below a third threshold. This third threshold is a threshold below the output power capacity of one inverter generator. In some examples, this third threshold is similar to the above described second threshold. This determination is repeated while the power draw is not below the third threshold.

A determination, at 626, that the power draw is below the third threshold causes the second inverter generator to be disconnected from the power output, at 628. In some examples, this determination further determines whether the power draw is below the third threshold for a specified amount of time prior to disconnecting the second inverter generator from the power output. In the above described example, the second inverter generator is disconnected from the power output by opening the second inverter output switch 514. The duplex inverter generator operating flow 600 then returns to measuring, at 602, power output and reiterating through the above described processing.

Figures 7, 8:
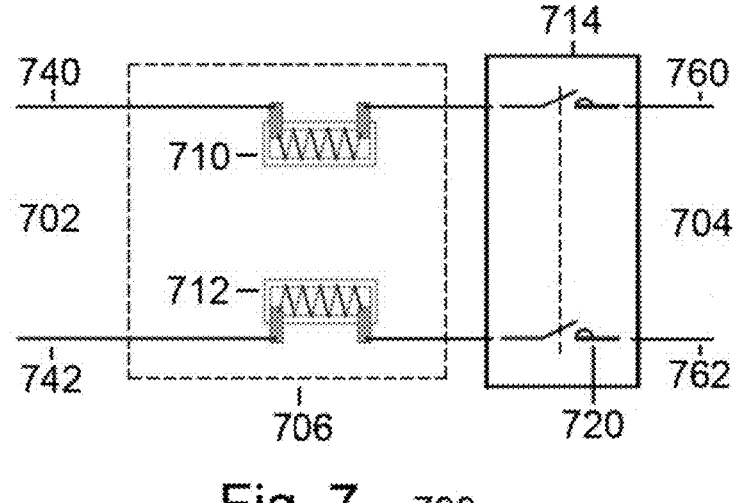
FIG. 7 illustrates a first low current coupling, according to an example.
FIG. 8 illustrates a second low current coupling, according to an example.

FIG. 7 illustrates a first low current coupling 700, according to an example. The first low current coupling 700 is one example implementation of the above described low current coupling 510 and low current coupling switch 512. The first low current coupling 700 receives bi-phase AC power via a first input line 740 and a second input line 742 of a first low current coupling input 702.

The first low current coupling 700 has a first low current coupling circuit 706. The first low current coupling circuit 706 is an example of a circuit that corresponds to the above described low current coupling 510. The first low current coupling 706 has a first resistor 710 connected to the first input line 740 of the first low current coupling input 702, and a second resistor 712 connected to the second input line 742 of the first low current coupling input 702. The first resistor 710 and the second resistor 712 are examples of current limiting resistors that are part of a low current coupler. In further examples, a current limiting resistor is able to include any device that limits current flow.

The first low current coupling 700 has a first low current coupling switch 714 that selectively couples, through the first resistor 710 and the second resistor 712, the first low current coupling input 702 to a first output line 760 and a second output line 762 of a first low current coupling output 704. The first low current coupling switch 714 is an example of an electronically controllable switch that is in series with the above described current limiting resistors that include the first resistor 710 and the second resistor 712. In an example, the first low current coupling switch 714 is able to include a timer relay. The first low current coupling switch 714 is controlled by a first low current coupling switch control signal 720. In the example of the duplex inverter generator block diagram 500 described above, the first low current coupling input 702 is coupled to the first power line 506 and the first low current coupling output 704 is coupled to the second power line 508 and is controlled via the first low current coupling switch control signal 720 by the control processor 530.

FIG. 8 illustrates a second low current coupling 800, according to an example. The second low current coupling 800 is another example implementation of the above describe low current coupling 510 and low current coupling switch 512. The second low current coupling 800 receives bi-phase AC power via a first input line 840 and a second input line 842 of a second low current coupling input 802.

The second low current coupling 800 has a second low current coupling circuit 806. The second low current coupling circuit 806 is another example of a circuit that corresponds to the above described low current coupling 510. The second low current coupling circuit 806 has a first thyristor 810 connected to the first input line 840 of the second low current coupling input 802, and a second thyristor 812 connected to the second input line 842 of the second low current coupling input 802. The combination of the first thyristor 810 and the second thyristor 812 are examples of a semiconductor switch that operates to electrically couple the first power line and the second power line while limiting current flowing therebetween. The second low current coupling circuit 806 further includes a thyristor controller 808 that operates to control the first thyristor 810 and the second thyristor 812 to control the electrical current flowing through those devices. The thyristor controller 808 is an example of a semiconductor switch controller that, when the low current coupler is coupling the first power line and the second power line, controls the semiconductor switch to couple the first power line to the second power line with limited current.

The second low current coupling 800 has a second low current coupling switch 814 that selectively couples, through the first thyristor 810 and the second thyristor 812, the second low current coupling input 802 to a first output line 860 and a second output line 862 of a second low current coupling output 804. In the example of the duplex inverter generator block diagram 500 described above, the second low current coupling input 802 is coupled to the first power line 506 and the second low current coupling output 804 is coupled to the second power line 508 and is controlled via the second low current coupling switch control signal 820 by the control processor 530. The second low current coupling switch 814 is an alternative example of an electronically controllable switch that is in series with a semiconductor switch, i.e., the first thyristor 810 and the second thyristor 812. In an example, the second low current coupling switch 814 is able to include a timer relay.

FIG. 9 illustrates an alternative duplex inverter block diagram 900, according to an example. The alternative duplex inverter block diagram 900 includes elements described above with regards to the duplex inverter generator block diagram 500 along with examples of various control circuits.

The alternative duplex inverter block diagram 900 includes an amp sensor 910 that is an example implementation of an AC output power load sensing device 542 or power meter. The amp sensor 910 in an example operates to determine when the output power level on the AC power output 540 exceeds a threshold. The amp sensor 910 provides, upon detection of the output power exceeding that threshold, an output to a surge control circuit 912. The surge control circuit 912 includes a timer to introduce a delay before activating, based on receipt of the output from the amp sensor 910, an output triggering the engine start/stop control 914. The engine start/stop control 914 operates to start the second engine 562 of the second inverter generator 504.

Once the second engine 562 of the second inverter generator 504 starts, a coupling circuit 520 operates to provide a coupling between the power output of the first inverter 556 and the second inverter 566 in a manner that facilitates frequency and phase synchronization of the AC output of the second inverter 566 with the AC output of the first inverter 556. Upon startup of the second inverter 566, electrical power present on the second power line 508 causes the low current coupling switch 512, such as the relay contacts 924 being operated by the coil 922 of the illustrated low current coupling switch 512, which is depicted as a timer relay, to close and provides a current limited coupling via the low current coupling 510. A timer 920 of the timer relay of the low current coupling switch 512 causes the relay contacts 924 to open after a specified time delay. Once the AC voltage on the second power line 508 stabilizes, as is determined by automatic actuation of a voltage protection relay 940, a power coupling timer relay 930 delays for a determined time period set by timer 932 prior to operating control contacts 934 to cause the second inverter output switch 514 to close and provide a low impedance connection between the first power output line 506 and the second power output line 508.

All references cited herein are expressly incorporated by reference in their entirety. It will be appreciated by persons skilled in the art that the invention is not limited to what has been particularly shown and described herein above. In addition, unless mention was made above to the contrary, it should be noted that all of the accompanying drawings are not to scale. There are many different features to the invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the invention set forth herein that are within the scope and spirit of the present invention are to be included as further embodiments of the invention.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

What is claimed is:

1. A multiple inverter generator, comprising:
a first inverter generator delivering alternating current (AC) power through a first power line to a power output;
a second inverter generator delivering AC power through a second power line;
a low current coupler alternately isolating and coupling the first power line and the second power line, the low current coupler, when coupling, operating to form an electrical connection that limits electrical current flowing between the first power line and the second power line;
a parallel power switch, in parallel with the low current coupler, selectively coupling the first power line and the second power line; and a controller configured to, when operating:
activate, while the parallel power switch is configured to electrically isolate the first power line from the second power line, the low current coupler for a synchronization time period to form the electrical connection that limits electrical current flowing between the first power line and the second power line; and
configure, within a time out period after activation of the low current couple for the synchronization time period, the parallel power switch to electrically connect the first power line and the second power line.

2. The multiple inverter generator of claim 1, further comprising an output power load sensing device configured to, when operating, measure a present amount of electrical power delivered to the power output, and wherein the controller is further configured to:
receive, from the output power load sensing device, a first measurement of the present amount of electrical power delivered to the power output;
activate, based on the first measurement of the present amount of electrical power delivered to the power output exceeding a first threshold, the low current coupler for the synchronization time period;
receive, from the output power load sensing device subsequent to receiving the first measurement, a second measurement of the present amount of electrical power delivered to the power output; and
configure, based on the second measurement of the present amount of electrical power delivered to the power output being received within a second time period and the second measurement exceeding a second threshold, the parallel power switch for the synchronization time period.

3. The multiple inverter generator of claim 1, wherein the first power line and the second power line each comprise a respective split phase power line.

4. The multiple inverter generator of claim 1, wherein the low current coupler comprises:
a current limiting resistor; and
a switch in series with the current limiting resistor.

5. The multiple inverter generator of claim 4, wherein the switch comprises a timer relay.

6. The multiple inverter generator of claim 1, wherein the low current coupler comprises:
a semiconductor switch that operates to electrically couple the first power line and the second power line while limiting current flowing therebetween; and
a semiconductor switch controller that, when the low current coupler is coupling the first power line and the second power line, controls the semiconductor switch to couple the first power line to the second power line with limited current.

7. The multiple inverter generator of claim 6, wherein the low current coupler further comprises an electronically controllable switch in series with the semiconductor switch.

8. The multiple inverter generator of claim 7, wherein the electronically controllable switch comprises a timer relay.

9. The multiple inverter generator of claim 1, wherein the synchronization time period comprises a time period sufficient to allow the second inverter generator to synchronize with the first inverter generator.

10. A method of operating a multiple inverter generator comprising a first inverter generator delivering alternating current (AC) power through a first power line to a power output and a second inverter generator delivering AC power through a second power line, wherein the method comprises:

activating, while a parallel power switch is configured to electrically isolate the first power line is isolated from the second power line, a low current coupler for a synchronization time period to form an electrical connection that limits electrical current flowing between the first power line and the second power line; and configuring, within a time out period after activation of the low current couple for the synchronization time period, the parallel power switch to electrically connect the first power line and the second power line.

11. The method of claim 10, further comprising:

receiving a first measurement of a present amount of electrical power delivered to the power output;

activating, based on the first measurement of the present amount of electrical power delivered to the power output exceeding a first threshold, the low current coupler for the synchronization time period;

receiving, subsequent to receiving the first measurement, a second measurement of the present amount of electrical power delivered to the power output; and configuring, based on the second measurement of the present amount of electrical power delivered to the power output being received within a second time period and the second measurement exceeding a second threshold, the parallel power switch for the synchronization time period.

12. The method of claim 10, wherein the first power line and the second power line each comprise a respective split phase power line.

13. The method of claim 10, wherein the low current coupler comprises:

a current limiting resistor; and a switch in series with the current limiting resistor.

14. The method of claim 13, wherein the switch comprises a timer relay.

15. The method of claim 10, wherein the low current coupler comprises a semiconductor switch that operates to electrically couple the first power line and the second power line while limiting current flowing therebetween, and wherein the method further comprises controlling the semiconductor switch to couple the first power line to the second power line with limited current.

16. The method of claim 15, wherein the low current coupler further comprises an electronically controllable switch in series with the semiconductor switch.

17. The method of claim 16, wherein the electronically controllable switch comprises a timer relay.

18. The method of claim 10, wherein the synchronization time period comprises a time period sufficient to allow the second inverter generator to synchronize with the first inverter generator.

* * * * *